US012154774B2

(12) United States Patent
Smith et al.

(10) Patent No.: US 12,154,774 B2
(45) Date of Patent: Nov. 26, 2024

(54) DEVICE CONTROL TO MAXIMIZE SYSTEM UTILIZATION

(71) Applicant: THERMO FINNIGAN LLC, San Jose, CA (US)

(72) Inventors: Johnathan W. Smith, Round Rock, TX (US); Scott T. Quarmby, Round Rock, TX (US)

(73) Assignee: Thermo Finnigan LLC, San Jose, CA (US)

( * ) Notice: Subject to any disclaimer, the term of this patent is extended or adjusted under 35 U.S.C. 154(b) by 474 days.

(21) Appl. No.: 17/538,229

(22) Filed: Nov. 30, 2021

(65) Prior Publication Data

US 2022/0181131 A1 Jun. 9, 2022

Related U.S. Application Data

(60) Provisional application No. 63/121,064, filed on Dec. 3, 2020.

(51) Int. Cl.
*H01J 49/00* (2006.01)
*H01J 49/42* (2006.01)

(52) U.S. Cl.
CPC ...... *H01J 49/0031* (2013.01); *H01J 49/0036* (2013.01); *H01J 49/4215* (2013.01)

(58) Field of Classification Search
CPC ............... H01J 49/0036; H01J 49/4215; H01J 49/0027; H01J 49/022; H01J 49/421
USPC .................................................. 250/281, 282
See application file for complete search history.

(56) References Cited

U.S. PATENT DOCUMENTS 8,704,161 B2 4/2014 Kawana
2015/0311050 A1* 10/2015 Smith .................... G06F 18/00
702/23

FOREIGN PATENT DOCUMENTS

EP 3054474 A1 8/2016

OTHER PUBLICATIONS

Jones, et al., "Simple radio-frequency power source for ion guides and ion traps", Review of Scientific Instruments, vol. 68, No. 9, Sep. 1997, pp. 3357-3362.
PCT/US2021/061679, International Search Report and Written Opinion, May 19, 2022, 23 pages.

* cited by examiner

*Primary Examiner* — Michael Maskell

(57) ABSTRACT

A mass spectrometer includes an ion source configured to produce ions from a sample; a set of quadrupole rods configured to select ions based on a mass-to-charge ratio; a DC rod driver configured to produce a voltage; a DC rod driver filter configured to filter RF frequency interference; and a controller. The controller is configured to utilize the results of the constrained convex optimization to cause a DC rod drive to produce the DC filter input and provide a required voltage to the set of quadrupole rods, the constrained convex utilizing a impulse response curve of the DC rod driver filter to determine a DC filter input to achieve the required voltage on the set of quadrupole rods; select ions passing through the set of quadrupole rods based on the mass-to-charge ratio; and measure the intensity of the ions.

23 Claims, 10 Drawing Sheets

DEVICE CONTROL TO MAXIMIZE SYSTEM UTILIZATION

FIELD

The present disclosure generally relates to the field of mass spectrometry including an improved device control to maximize system utilization.

INTRODUCTION

Quadrupole mass analyzers are one type of mass analyzer used in mass spectrometry. As the name implies, a quadrupole consists of four rods, usually cylindrical or hyperbolic, set in parallel pairs to each other, as for example, a vertical pair and a horizontal pair. These four rods are responsible for selecting sample ions based on their mass-to-charge ratio (m/z) as ions are passed down the path created by the four rods. Ions are separated in a quadrupole mass filter based on the stability of their trajectories in the oscillating electric fields that are applied to the rods. Each opposing rod pair is connected together electrically, and a radio frequency (RF) voltage with a DC offset voltage is applied between one pair of rods and the other. Ions travel down the quadrupole between the rods. Only ions of a certain mass-to-charge ratio will be able to pass through the rods and reach the detector for a given ratio of voltages applied to the rods. Other ions have unstable trajectories and will collide with the rods. This permits selection of an ion with a particular m/z or allows the operator to scan for a range of m/z-values by continuously varying the applied DC and RF voltages.

By setting stability limits via applied RF and DC potentials that are capable of being ramped as a function of time, such instruments can be operated as a mass filter, such that ions with a specific range of mass-to-charge ratios have stable trajectories throughout the device. In particular, by applying fixed and/or ramped AC and DC voltages to configured cylindrical but more often hyperbolic electrode rod pairs in a manner known to those skilled in the art, desired electrical fields are set-up to stabilize the motion of predetermined ions in the x and y dimensions. As a result, the applied electrical field in the x-axis stabilizes the trajectory of heavier ions, whereas the lighter ions have unstable trajectories. By contrast, the electrical field in the y-axis stabilizes the trajectories of lighter ions, whereas the heavier ions have unstable trajectories. The range of masses that have stable trajectories in the quadrupole and thus arrive at a detector placed at the exit cross section of the quadrupole rod set is defined by the mass stability limits.

It is desirable to make the best measurements on selected reaction monitoring (SRM) and selected ion monitoring (SIM) methods possible, and it can be desirable to do many of them really fast. To get the best measurements you need to have the quadrupole at the specified settings for a given duration to allow the ions of interest time to pass through and be measured. However, there is a trade-off between the number of monitored mass-to-charge ratios and the quality of the data given there is a finite time to obtain the measurements. Additionally, there are time delays when changing between quadrupole states that cause periods of time where nothing can be measured. From the foregoing it will be appreciated that a reduction in the time delays could increase the number and quality of measurements.

SUMMARY

In a first aspect, a method can include obtaining an impulse response curve for an electrical component; performing a constrained convex optimization to determine an DC filter input to achieve a required voltage on a set of quadrupole rods; utilizing the results of the constrained convex optimization to cause a DC rod drive to produce the DC filter input; selecting ions passing through the set of quadrupole rods based on the mass-to-charge ratio; measuring the intensity of the ions.

In a second aspect, a method can include supplying a first set of voltages to a multipole to select a first target mass-to-charge ratio; maintaining the first set of voltages while collecting intensity data for ions having the first target mass-to-charge ratio; scanning from the first set of voltages to a second set of voltages while collecting intensity data for ions within the range of mass-to-charge ratios between the first target mass-to-charge ratio and a second target mass-to-charge ratio, wherein the second set of voltages select the second target mass-to-charge ratio; maintaining the second set of voltages while collecting intensity data for ions having the second mass-to-charge ratio; and generating a mass spectrum using the intensity data for ions within the range of mass-to-charge ratios.

In a third aspect, a mass spectrometer can include an ion source configured to produce ions from a sample; a set of quadrupole rods configured to select ions based on a mass-to-charge ratio; a DC rod driver configured to produce a voltage; a DC rod driver filter configured to filter RF frequency interference; and a controller. The controller can be configured to utilize the results of the constrained convex optimization to cause a DC rod drive to produce the DC filter input and provide a required voltage to the set of quadrupole rods, the constrained convex utilizing a impulse response curve of the DC rod driver filter to determine a DC filter input to achieve the required voltage on the set of quadrupole rods; select ions passing through the set of quadrupole rods based on the mass-to-charge ratio; and measure the intensity of the ions.

In a fourth aspect, a mass spectrometer can include an ion source configured to produce ions from a sample; a set of quadrupole rods configured to select ions based on a mass-to-charge ratio; DC rod driver configured to produce a voltage and supply the voltage to the set of quadrupole rods; a DC rod driver filter configured to filter RF frequency interference; and a controller. The controller can be configured to supply a first set of voltages to the set of quadrupole rods to select a first target mass-to-charge ratio; maintain the first set of voltages while collecting intensity data for ions having the first target mass-to-charge ratio; scan from the first set of voltages to a second set of voltages on the quadrupole rods while collecting intensity data for ions within the range of mass-to-charge ratios between the first target mass-to-charge ratio and a second target mass-to-charge ratio, wherein the second set of voltages select the second target mass-to-charge ratio; maintain the second set of voltages on the quadrupole rods while collecting intensity data for ions having the second mass-to-charge ratio; and generate a mass spectrum using the intensity data for ions within the range of mass-to-charge ratios, intensity data for ions having the first target mass-to-charge ratio, and intensity data for ions having the second mass-to-charge ratio.

DRAWINGS

For a more complete understanding of the principles disclosed herein, and the advantages thereof, reference is now made to the following descriptions taken in conjunction with the accompanying drawings, in which.

Figure 1:
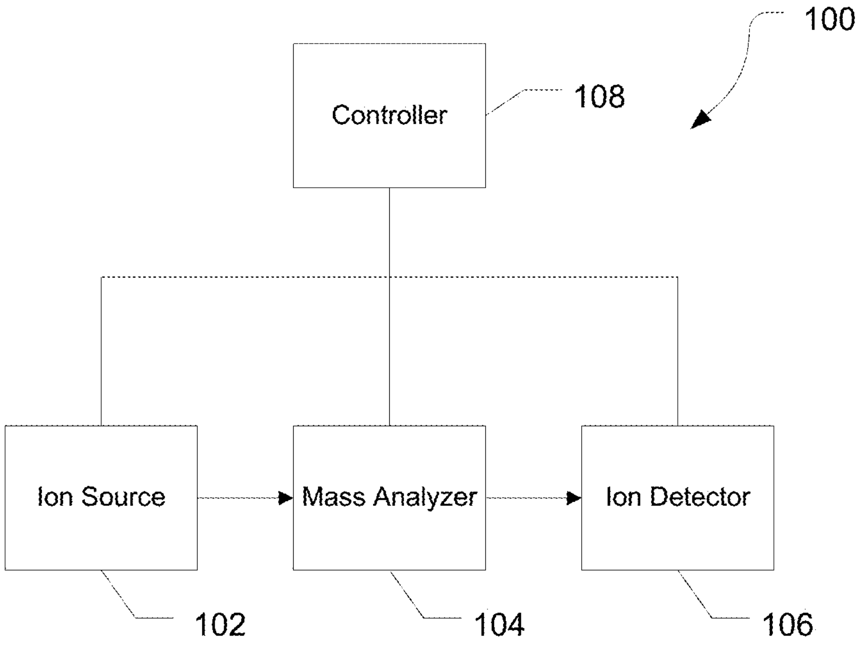
FIG. 1 is a block diagram of an exemplary mass spectrometry system, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods to dynamically exclude product ions that may be present in the master scan are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 104 can separate ions based on a mass-to-charge ratio (m/z) of the ions. For example, the mass analyzer 104 can include a quadrupole mass filter analyzer, a quadrupole ion trap analyzer, a time-of-flight (TOF) analyzer, an electrostatic trap mass analyzer (e.g., ORBITRAP mass analyzer), Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the mass spectrometry platform 100 can include multiple mass analyzers. In this way, mass analysis can be performed on two sets of ions at the same time. Additionally, the mass analyzers may have different mass accuracies and/or resolutions, such as a high-resolution electrostatic trap mass analyzer and a lower resolution quadrupole mass analyzer or ion trap mass analyzer.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source 102 or enable/disable the ion source 102. Additionally, the controller 108 can configure the mass analyzer 104 to select a particular mass range to detect. Further, the controller 108 can adjust the sensitivity of the ion detector 106, such as by adjusting the gain. Additionally, the controller 106 can adjust the polarity of the ion detector 106 based on the polarity of the ions being detected. For example, the ion detector 106 can be configured to detect positive ions or be configured to detected negative ions.

DC Rod Drive Control

Resolving quadrupole-based mass spectrometers are limited in the speed that they can perform SRM and SIM experiments due to the time it takes to change the state of the resolving DC field on the device. This device and others in the instrument traditionally require waiting for a settling time before the instrument can be utilized to make appropriate measurements.

There are multiple time delays that contribute to the delay caused by changing quadrupole states. The settling time for the RF can be relatively short, and flight time through the collision cell has improved with axial fields. The biggest time delay is the time it takes the resolving DC to achieve a stable value at the new state.

In various embodiments, the settling time of a quadrupole can be dramatically reduced by implementing control methods disclosed herein which are based around measuring the response of the device and then formulating a prediction of how to drive a device to gain improved precision and control.

Traditionally the resolving DC is set by controlling the output of a high voltage variable DC output which is then fed through a filter. This filter is critical to achieve the precision needed for the quadrupole to accurately filter ions out of the ion beam. This filter also prevents unwanted RF waveforms from traveling back into the DC rod driver and causing problems such as instability and even circuit damage.

This filter adds an intrinsic time delay between the rod driver and the quadrupole. This time delay can be on the order of hundreds of microseconds to tens of millisecond or more, which limits the number of SRM or SIM measurements that can be performed per second. While the time delay of the filter can be reduced, it is usually at the cost of power or filter quality so there are limits to what can be done.

Additionally, the RF prevents using the voltage on the quadrupole as feedback to get precise voltage control. Instead, the rod driver output is typically used for feedback instead. However, the delays introduced by the filter mean the voltage on the quadrupole lags the feedback used in controlling the voltage. This can be problematic.

The resolving DC on a quadrupole is a result of the convolution of the impulse response of the DC rod driver output filter and the output of the DC rod driver. Solving for the filter response will yield an appropriate DC rod driver output to give us the optimal resolving DC on the quadrupole rods. Specifically, the impulse response of the filter can be characterized while the RF is off, allowing direct measurement of the RF on the output side of the filter. Using this information, the long delay imposed by the DC rod driver filter can be compensated for mathematically to create an optimum input drive signal so that the filter output closely matches the desired DC voltage on the quadrupole rods. Advantageously, this can significantly reduce settling times and reduce time lost during an experiment waiting for the DC voltage on the quadrupole to stabilize.

Figure 2:
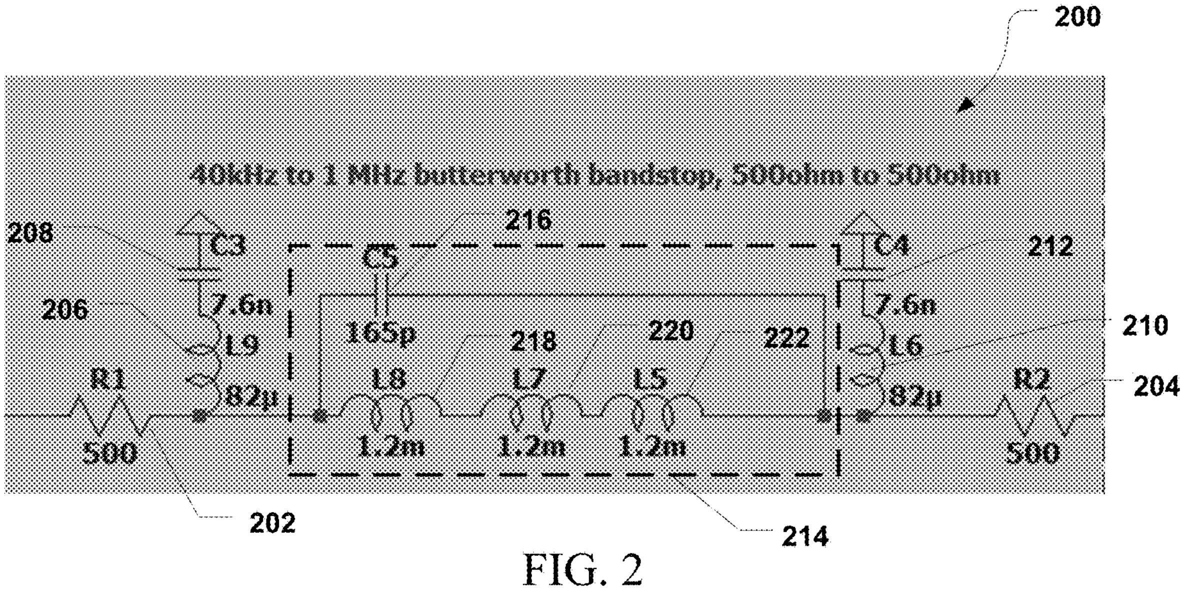
FIG. 2 is a diagram illustrating an exemplary DC rod driver filter, in accordance with various embodiments.

The process can be demonstrated using the exemplary DC rod driver output filter 200 shown in FIG. 2. FIG. 2 illustrates an exemplary DC rod driver output filter 200. DC rod driver output filter 200 is a butterworth bandstop filter covering from about 40 kHz to about 1 MHz. The filter 200 includes a resistor 202 on the input side of the filter and a resistor 204 on the output side of the filter. Adjacent to resistor 202 is a connection to ground including an inductor 206 and capacitor 208 in series to filter high frequency noise. Similarly, a second connection to including an inductor 210 and capacitor 212 is adjacent to resistor 204. The filter also includes a resonant circuit 214 including a capacitor 216 in parallel with a series of inductors 218, 220, and 222.

Figure 3A:
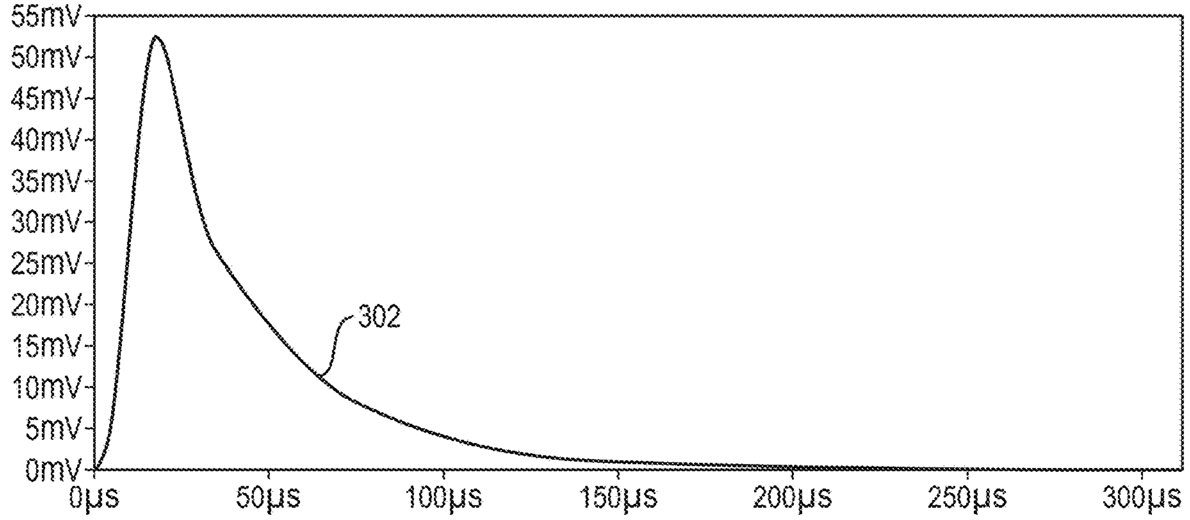
FIG. 3A is a graph illustrating the impulse response of an exemplary DC rod driver filter, in accordance with various embodiments.

FIG. 3A illustrates the impulse response curve 302 of the DC rod driver filter, as modeled by LTSpice. The load from the quadrupole rod set is modeled as a 32 nF capacitor in series with a 470 nH inductor.

The impulse response function can be represented as a 1D vector 'h'. This can be turned into a Toeplitz matrix A by shifting each column by 1 compared with the one before it. Optionally, matrix A can be turned into a circulant matrix H by padding the final edges of the matrix by the length of the h vector. This padding allows us to perform solutions with discrete Fourier transforms instead of full matrix operations, thus tremendously speeding the calculations. As a result, the output of the filter can be determined according to $A*x=b$, where x is the 1D vector of the rod driver output (the input to the filter) and b is the resulting output of the filter.

Figure 3B:
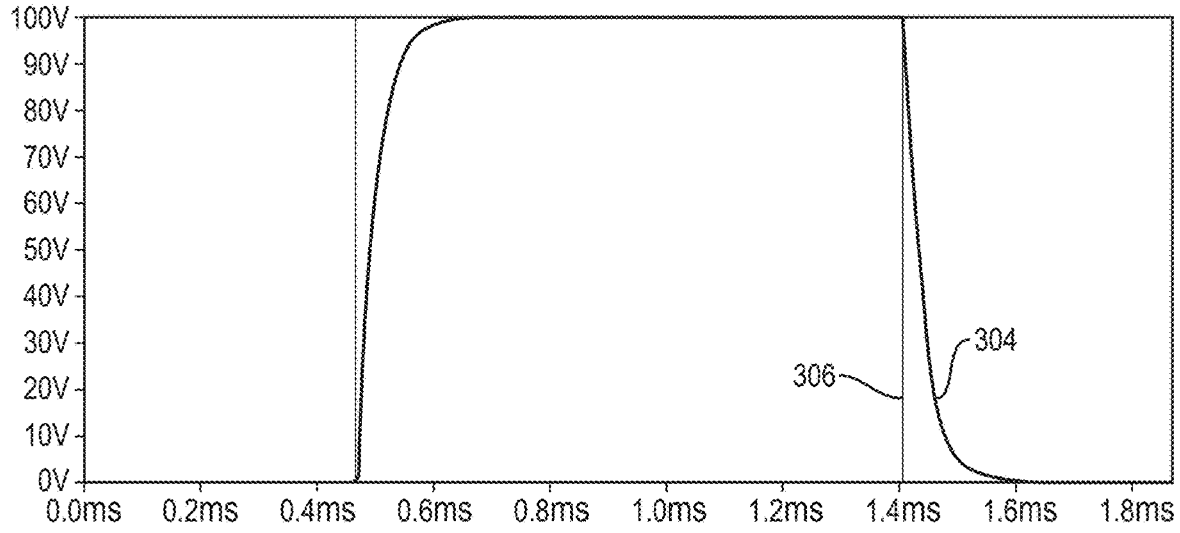
FIG. 3B is a graph illustrating the output of an exemplary DC rod driver filter when provided with a square wave input, in accordance with various embodiments.

FIG. 3B illustrates the output 304 of the DC rod driver output filter for the input (DC rod driver output) 306, as modeled by LTSpice.

In various embodiments, the mathematical relationship between the rod driver output and the output of the filter can be used to determine a rod driver output required to achieve the desired output from the rod driver filter. However, solving this problem with no other constraints can result in solutions that are typically not physically feasible. In general, the unconstrained solution can have slew rates and bandwidths orders of magnitude larger that the DC rod drive can physically provide. Additionally, the unconstrained solution can require voltage outputs much larger than can be physically provided.

Rather than solving for the unconstrained solution, a constrained problem can be constructed and solved with convex optimization methods. This constrained problem's solution can be used to provide practical solution that can be implemented with hardware. It is desirable to have extremely close output value tracking while minimizing big deviations that occur when actually changing states. Limits can be placed on the slew rates of the input signal and the input magnitude. Additionally, it can be desirable to limit the amount of power the DC rod driver power supply must provide. In various embodiments, the amount of ripple the input will have can be limited in order to limit pulling from the positive and negative DC rod driver supplies during any given transition. Using both rails for a given transition results in wasted power that does not go into the final voltage value on the quadrupole rod. This can be expressed as $$\text{minimize}\{\,|\,\|Ax-b\|_1 + \|c * Dx\|_1 + \|f * E(Dx)\|_1\}$$

$$\text{subject to}\begin{Bmatrix} x > R_{min} \\ x < R_{max} \\ Dx < S_{max} \\ Dx > S_{min} \end{Bmatrix}$$

where D is the matrix that gives the element by element derivative of x when multiplied, E is the matrix that gives the derivative of Dx result, and c and f are weighting terms. Additional constraints can be element-wise evaluations. R is the rail min and max values and S is the slew rate limit.

In various embodiments, it may be desirable to restrict the input x values to be integers. This constraint allows to naturally obtain DAC output values from the solution. This can also naturally incorporate a dithering effect to gain better output resolution than the DAC would naturally be thought to have by exploiting the higher speed of the DAC and rod driver than what the analog bandwidth of the filter has.

One of skill in the art would understand that other similar formulation of this problem can yield practical results. For example, all of the norms in the minimization statement can be replaced with an l2-norm value or Huber function or other valid convex options. These can also be mixed and matched. For example, a l2-norm value can be used for the second derivative but not for the other terms. In various embodiments, c and f may be set to zero, relying on the additional constraints to satisfy the physical capability of driving the output.

The desired output of the DC rod driver filter can be used to calculate the required voltage from the DC rod driver to achieve the desired output of the DC rod driver filter. However, the solution needs to provide physically feasible values to achieve the improved result on the quadrupole rod.

Figure 3C:
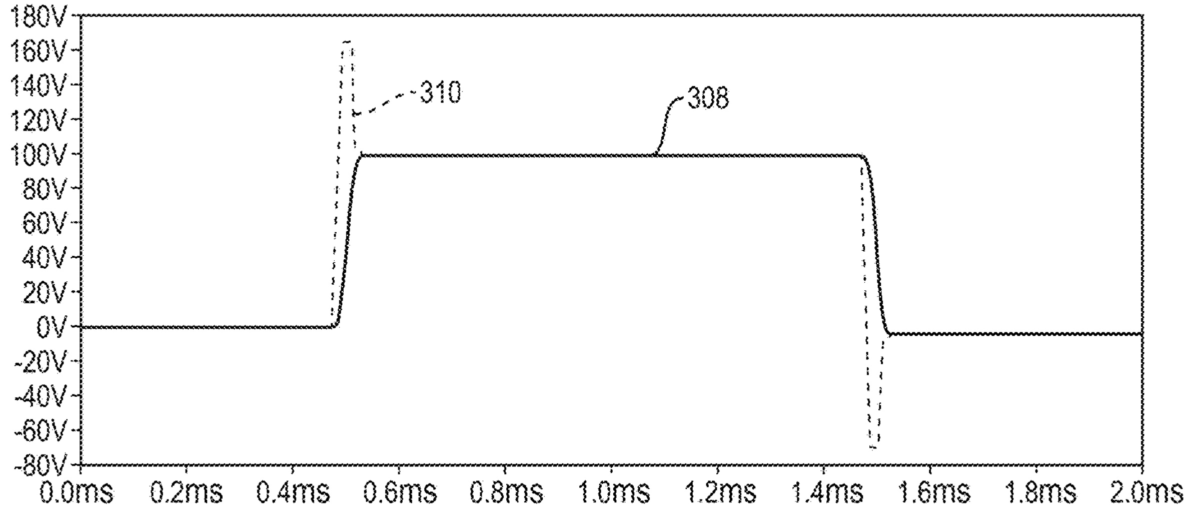
FIG. 3C is a graph illustrating the output of an exemplary DC rod driver filter when provided with an input calculated to provide a square wave output, in accordance with various embodiments.

The result of solving the problem for the exemplary DC rod driver filter 200 of FIG. 2, is shown in FIG. 3C. For the following solutions, rail limits of +1000 and −1000 V and the slew rate limit 9 V/us are used. FIG. 3C illustrates the output 308 of the DC rod driver output filter for the input (DC rod driver output) 310, as modeled by LTSpice. Input 310 is the optimized DC rod driver output determined based on the optimization described above. Output 308 reaches the desired voltage 312 more quickly than output 304 of FIG. 3B, resulting in an improved settle time for the DC voltage. The reduced settle time can reduce instrument dead time where data cannot be obtained while switching between SIM or SRM states. As such, the number of transitions per second can be increased. In various embodiments, the disclosed methods can be used to obtain at least about 1000 SIM/SRM measurements per second, although generally less than about 10,000 SIM/SRM measurements per second is achievable.

Figure 4:
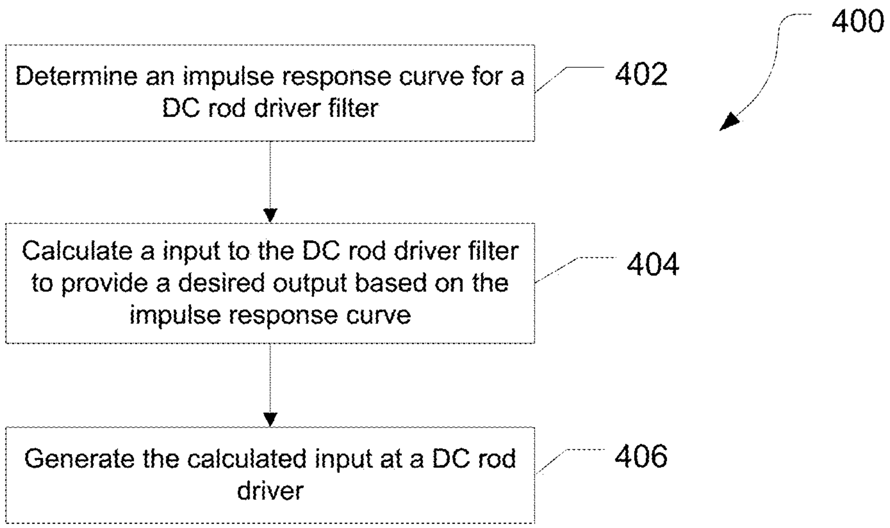
FIG. 4 is a flow diagram illustrating a method of generating an input to a RC rod driver filter to produce a desired output, in accordance with various embodiments.

FIG. 4 illustrates an exemplary method for producing a DC output to supply a quadrupole rod or rod pair. At 402, the impulse response for the DC rod driver filter can be determined. In various embodiments, a theoretical impulse response can be determined by modeling the DC rod driver filter, such as in LTSpice. In other embodiments, the impulse response can be measured empirically. In some embodiments, the impulse response can be measured on an exemplary system and used for all similar systems, while in other embodiments, the impulse response can be determined for each system. In various embodiments, measuring the impulse response can be performed in the factory. In yet other embodiments, the impulse response can be determined by monitoring the ion signal response. In some instances, the theoretical model can be tuned in-system by adjusting to account for the ion signal response.

At 404, the input to the DC rod driver filter to achieve a desired output can be calculated using the determined impulse response. In various embodiments, the input can be determined when building a method and can be used for all subsequent uses of the method. In other embodiments, a library can be generated of often used changes and the method can be built using the library of inputs. In yet other embodiments, the input can be calculated at the beginning of a run or a series of runs.

At 406, the DC rod driver can produce the calculated input for the DC rod driver filter and the output of the DC rod driver filter can be provided to the rods of the multipole.

Hybrid Scan

In various embodiments, this approach can also be used to improve scanning over a mass range when applied to abrupt changes in the scan rate or pauses in a scan. The next example represents the results for starting at a static value and then immediately starting scanning at 50,000 amu/s with a pause at the top and then a scan back down at 50,000 amu/s. This scan could be used for a hybrid SIM/SRM and full scan. SIM/SRM is desirable because of the improved detection limit. However, as the voltage is fixed, a SIM/SRM does not provide information about analytes at an m/z not targeted by the SIM/SRM. Being able to scan very quickly could make such a hybrid scan feasible.

Figure 5A:
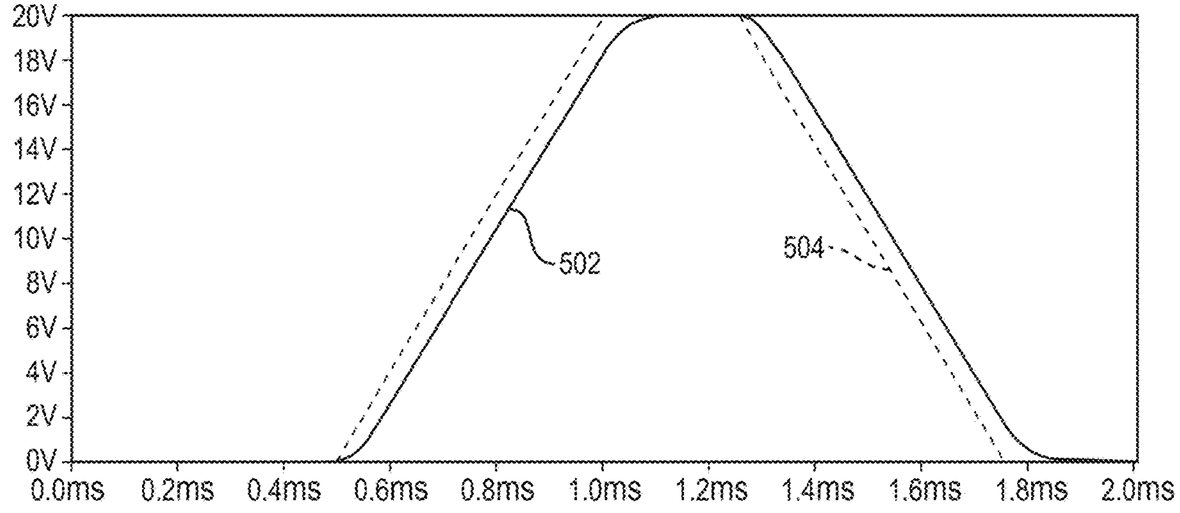
FIG. 5A is a graph illustrating the input and corresponding output of an exemplary DC rod driver filter, in accordance with various embodiments.

FIG. 5A illustrates the output 502 of the DC rod driver output filter for the input (DC rod driver output) 504, as modeled by LTSpice. Input 504 is the traditional DC rod driver output without optimizing for the DC rod driver output filter response.

Figure 5B:
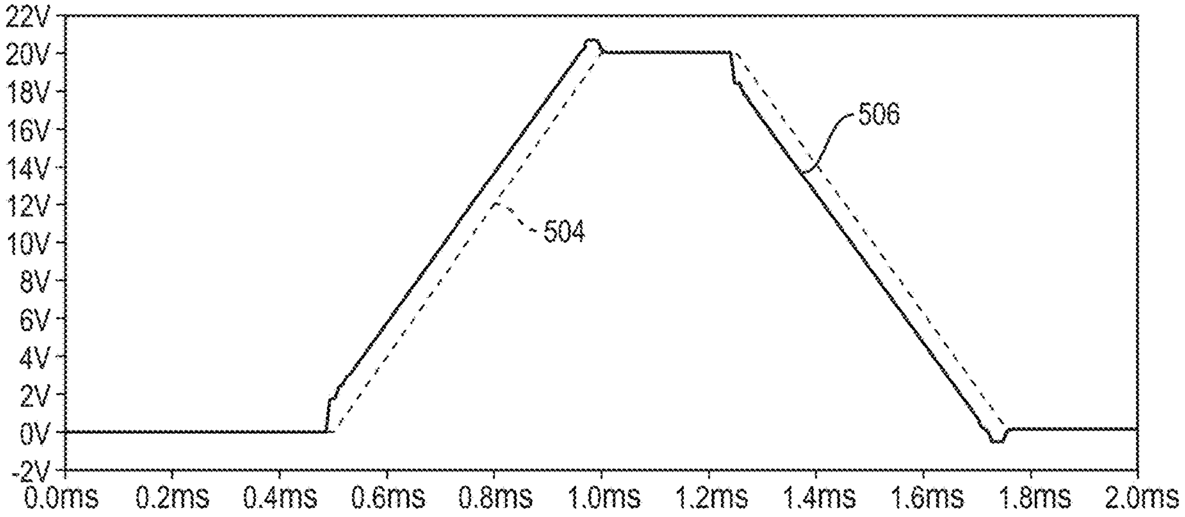
FIG. 5B is a graph illustrating the optimized input calculated to produce a desired output from the DC rod driver filter, in accordance with various embodiments.
Figure 5C:
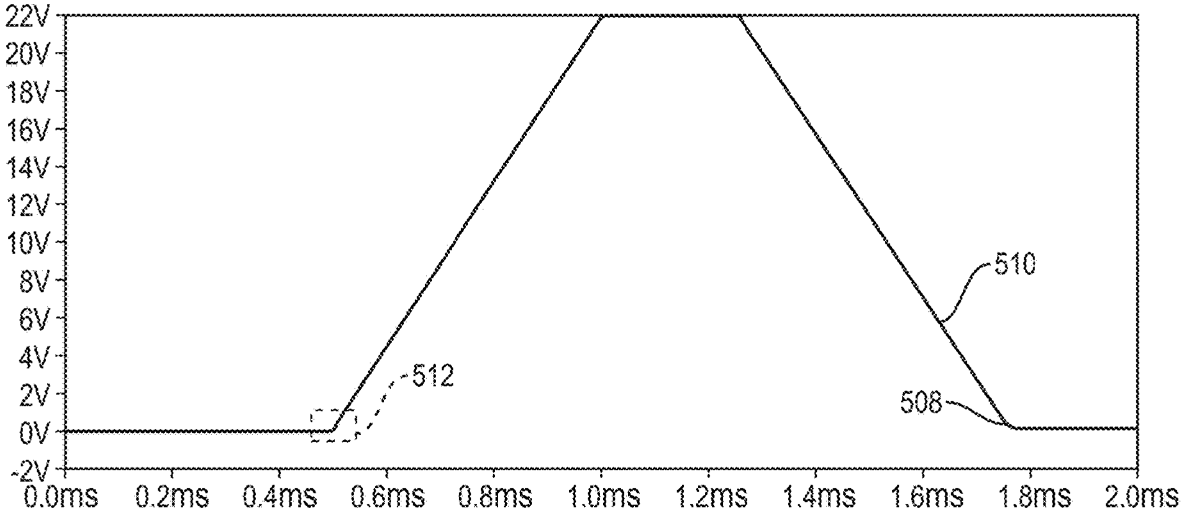
FIGS. 5C and 5D are graph illustrating the desired output used to calculate the input and the actual output of an exemplary DC rod driver filter when provided with the calculated input, in accordance with various embodiments.
Figure 5D:
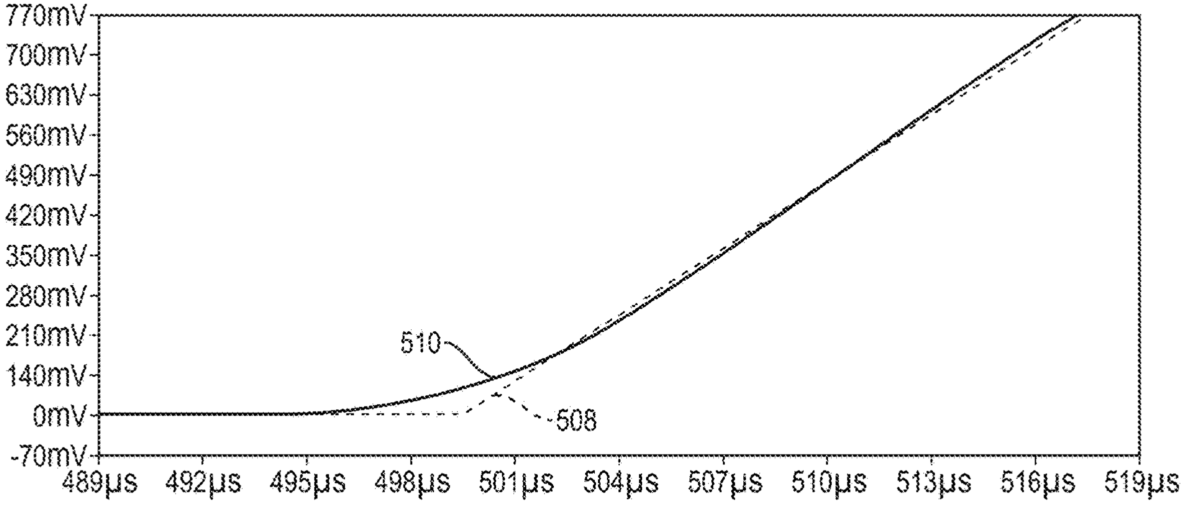

FIG. 5B illustrates the input (DC rod driver output) 504 from FIG. 5A and the optimized input 506. FIGS. 5C and 5D are overlays the desired output 508 with the simulated output 510 of the DC rod driver output filter when using the optimized input 506. FIG. 5D is a zoomed in view of the initial ramp start in area 512 of FIG. 5C.

As can be seen, the tracking values are extremely close throughout the entire ramp start despite attempting a hard angle change. The typical delay that would need to have a long running head start from lower masses has also been mostly eliminated with this method. This can improve operation when scanning up from low mass (<30 amu), such as for an air/water analysis, and very low masses (<10 amu), such as a light gas analysis looking at hydrogen and helium. The need for a running start to allow for the response delays limits the scan rate that can be used for low and very low masses. In various embodiments, the disclosed methods can be used to scan for masses <10 amu, such as for a light gas analysis, at a scan rate of at least about 1000 amu/sec or for an air water analysis which typically start at about 16 amu at a rate of at least about 16,000 amu/sec. For more typical GC/MS analysis, such as starting around about 30 to 40 amu, scan rates of at least about 50,000 amu/sec is achievable.

Generally, the scan rate may be limited to less than about 1,000,000 amu/sec, such as less than about 500,000 amu/sec.

In various embodiments, since the amount of lead that the drive needs to compensate for any given scan rate is automatically included in the output, changes in the scan rate are possible without needing to restart the ramp or missing a portion of the mass range.

Figure 6A:
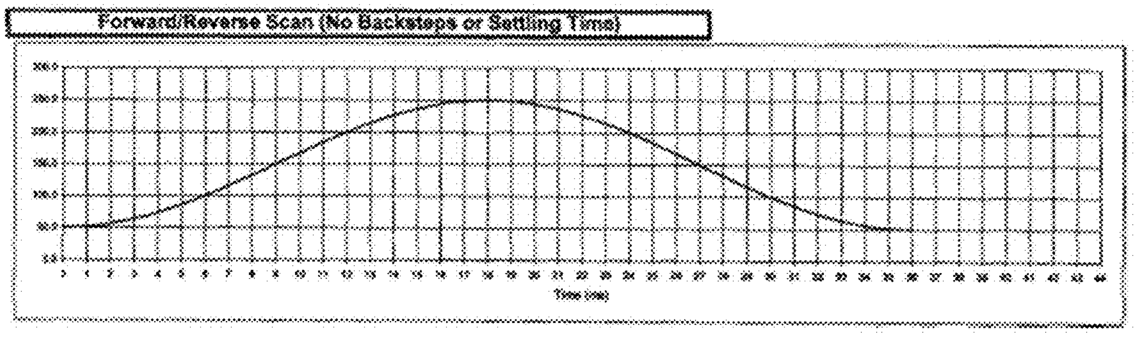
FIG. 6A is a graph illustrating a forward and reverse mass scan without backstepping or settling time delays, in accordance with various embodiments.

FIG. 6A illustrates an exemplary method of a continuously changing scan rate. FIG. 6A illustrates a sine wave for performing a forward and reverse scanning without, as disclosed in U.S. Pat. No. 8,735,807, incorporated herein by reference. Data can be collected in both directions to reduce spectral skewing on beam instruments. A preferred embodiment was a non-linear scan such as a sine wave. The use of a sine wave can avoid sudden changes in slope which would require a long DC settling time using prior systems. Using the disclosed techniques, the maximum scan rate for a scan like this could be increased as the DC filter delay is not a significant factor as it is with prior systems.

Figure 6B:
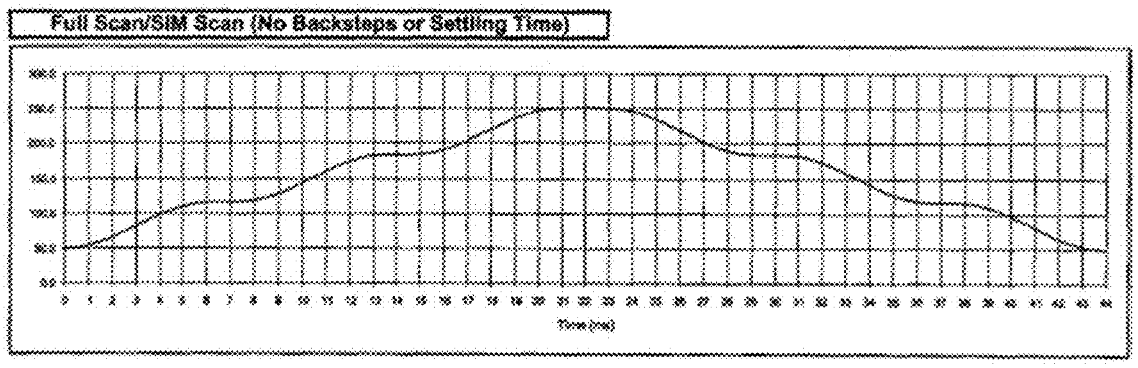
FIG. 6B is a graph illustrating a hybrid scan including plateaus for monitoring SIM/SRM ions, in accordance with various embodiments.

FIG. 6B illustrates a hybrid scan with plateaus for obtain SIM data as well as forward and reverse scanning, also disclosed in U.S. Pat. No. 8,735,807. Here again, the scan rate is limited using prior methods due to the desire to avoid long settling times. Using the disclosed techniques to accommodate sudden changes in scan rate, faster scan rates are possible.

Figure 7A:
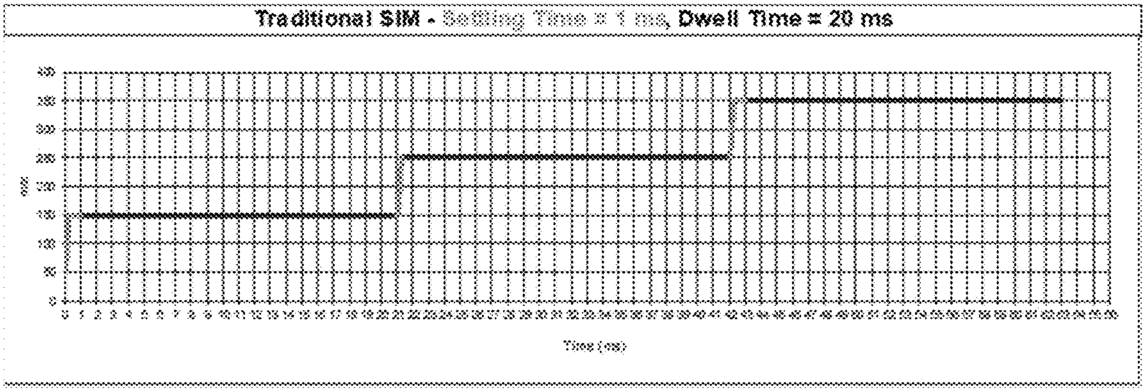
FIG. 7A is a graph illustrating a typical SIM or SRM voltage with rapid jumps, in accordance with various embodiments.

FIG. 7A illustrates a traditional 3 ion SIM. A settling time of 1 ms is needed between dwell times of 20 ms. No data are acquired during the settling time.

Figure 7B:
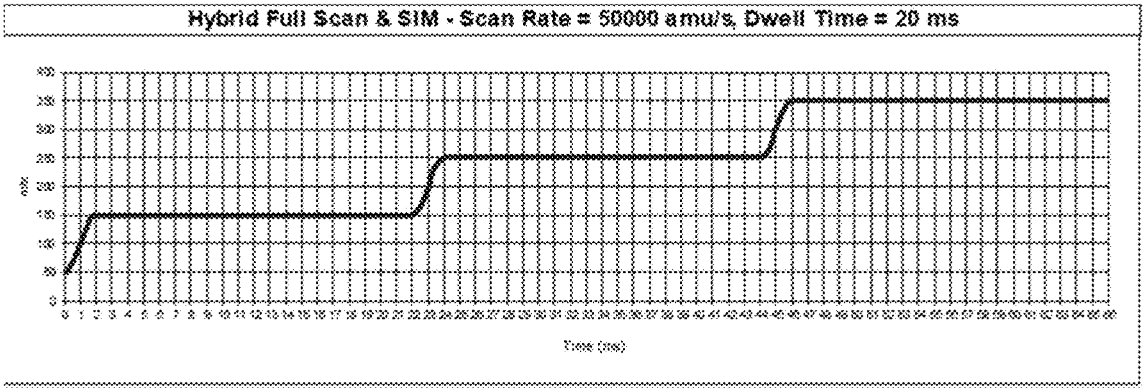
FIG. 7B is a graph illustrating a hybrid SIM/SRM including rapid scans between SIM/SRM states, in accordance with various embodiments.

FIG. 7B illustrates a new hybrid full scan and SIM made possible by the disclosed techniques. A scan rate of 50,000 amu/sec can be performed between the SIM ions. Assuming a typical m/z jump between SIM ions is approximately 100 amu, the m/z range between the SIM ions can be scanned in about 2 ms. As a result, for a small increase in total scan time (<5%) compared to the traditional 3 ion SIM in FIG. 7A, a full scan can be obtained in addition to the SIM ions. In the traditional SIM scan (FIG. 7A) only the three SIM m/z ions are measured, in this case m/z 150, 250, and 350. The total scan time is 63 ms. With the hybrid full scan and SIM (FIG. 7B), all ions from m/z 50 to 350 are measured. This scan only takes 66 ms, 3 ms (~5%) longer. This technique also avoids the wasted time between SIM ions in the traditional SIM, improving the duty cycle.

Figure 8:
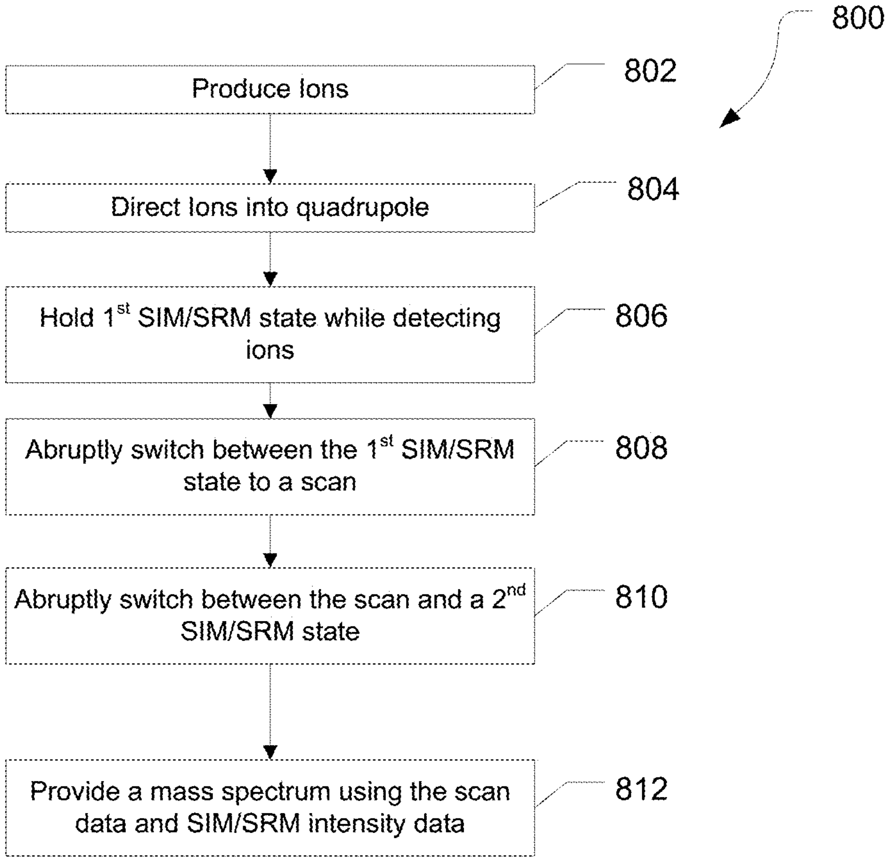
FIG. 8 is a flow diagram illustrating a method of performing a hybrid SIM/SRM, in accordance with various embodiments.

FIG. 8 illustrates an exemplary method a performing a hybrid scan, similar to that illustrated in FIG. 7B. At 802, a sample can be ionized to produce a continuous beam of ions for analysis. At 804, the ions can be directed into a quadrupole.

At 806, a first set of DC voltages corresponding to a first SIM/SRM state can be applied to the rods of the quadrupole while detecting the ions that pass through the quadrupole. Additionally, corresponding RF potentials can be applied to the rods of the quadrupole such that ions within a specific m/z range can pass through the quadrupole. Intensity data can be collected during the SIM/SRM state and correlated to the m/z of ions passing through the quadrupole.

At 808, the DC rod driver can produce an output voltage profile designed create a rapid switch in the output of the DC rod driver filter from the steady state voltage to a voltage ramp. Corresponding changes can be made to the RF potential such that the quadrupole rapidly switches from a SIM/SRM state to a scan over a mass range. The scan can be at a rate of at least about 5,000 amu/sec, such as at least about 10,000 amu/sec, such as at least about 25,000 amu/sec, even at least about 50,000 amu/sec. Intensity data can be collected during the switch and through the ramp and the intensity data can be correlated to the m/z of the ions the pass through the quadrupole.

At 810, the DC rod driver can produce an output voltage profile designed create a rapid switch in the output of the DC rod driver filter from the voltage ramp to a stead state voltage corresponding to a second SIM/SRM state. Corresponding changes can be made to the RF potential such that the quadrupole rapidly switches from scanning over a mass range to the second SIM/SRM state. Intensity data can be collected during the switch and through the second SIM/SRM state and the intensity data can be correlated to the m/z of the ions the pass through the quadrupole.

At 812, a mass spectrum can be generated from the data collected and provided to a user. Additionally, SIM/SRM intensity data can for each of the SIM/SRM states can be provided.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A method comprising:

obtaining an impulse response curve for an electrical component;

performing a constrained convex optimization using the impulse response curve to determine a DC filter input to achieve a required voltage on a set of quadrupole rods;

utilizing the results of the constrained convex optimization to cause a DC rod driver to produce the DC filter input;

selecting ions passing through the set of quadrupole rods based on the mass-to-charge ratio; and measuring the intensity of the ions.

2. The method of claim 1 wherein the electrical component is a DC filter.

3. The method of claim 1 wherein the impulse response curve is a theoretical impulse response curve determined by modeling a DC filter.

4. The method of claim 3 wherein the theoretical impulse response curve is adjusted to account for an ion signal response.

5. The method of claim 1 wherein the impulse response curve is an empirically determined impulse response curve.

6. The method of claim 5 wherein the empirically determined impulse response curve is determined by monitoring an ion signal response.

7. The method of claim 5 wherein the empirically determined impulse response curve is measured for a similar electrical component on an exemplary system.

8. The method of claim 5 wherein the empirically determined impulse response curve is measured for the electrical component in the factory.

9. The method of claim 5 wherein the empirically determined impulse response curve is measured for the electrical component during tuning.

10. The method of claim 1 wherein the constrained convex optimization is performed when building an instrument method and is used for subsequent uses of the instrument method.

11. The method of claim 1 wherein the constrained convex optimization is performed at the beginning of a run or series of runs.

12. The method of claim 1 wherein the DC filter input is generated from a library of often used changes.

13. A mass spectrometer comprising:

an ion source configured to produce ions from a sample;

a set of quadrupole rods configured to select ions based on a mass-to-charge ratio;

a DC rod driver configured to produce a voltage;

a DC rod driver filter configured to filter RF frequency interference; and a controller configured to:

utilize the results of a constrained convex optimization to cause the DC rod driver to produce a DC filter input and provide a required voltage to the set of quadrupole rods, the constrained convex optimization utilizing an impulse response curve of the DC rod driver filter to determine the DC filter input to achieve the required voltage on the set of quadrupole rods;

select ions passing through the set of quadrupole rods based on the mass-to-charge ratio; and measure the intensity of the ions.

14. The mass spectrometer of claim 13 wherein the impulse response curve is a theoretical impulse response curve determined by modeling the DC rod driver filter.

15. The mass spectrometer of claim 14 wherein the theoretical impulse response curve is adjusted to account for an ion signal response.

16. The mass spectrometer of claim 13 wherein the impulse response curve is an empirically determined impulse response curve.

17. The mass spectrometer of claim 16 wherein the empirically determined impulse response curve is determined by monitoring an ion signal response.

18. The mass spectrometer of claim 16 wherein the empirically determined impulse response curve is measured for a similar DC rod driver filter on an exemplary system.

19. The mass spectrometer of claim 16 wherein the empirically determined impulse response curve is measured for the DC rod driver filter in the factory.

20. The mass spectrometer of claim 16 wherein the empirically determined impulse response curve is measured for the DC rod driver filter during tuning.

21. The mass spectrometer of claim 13 wherein the constrained convex optimization is performed when building an instrument method and is used for subsequent uses of the instrument method.

22. The mass spectrometer of claim 13 wherein the constrained convex optimization is performed at the beginning of a run or series of runs.

23. The mass spectrometer of claim 13 wherein the DC filter input is generated from a library of often used changes.

* * * * *